United States Patent
Hojsik et al.

(10) Patent No.: US 10,587,421 B2
(45) Date of Patent: Mar. 10, 2020

(54) TECHNIQUES FOR GENUINE DEVICE ASSURANCE BY ESTABLISHING IDENTITY AND TRUST USING CERTIFICATES

(71) Applicant: Honeywell International Inc., Morris Plains, NJ (US)

(72) Inventors: Michal Hojsik, Prague (CZ); Harshal S. Haridas, Jamison, PA (US); Lukas Pohanka, Prague (CZ)

(73) Assignee: Honeywell International Inc., Morris Plains, NJ (US)

( * ) Notice: Subject to any disclaimer, the term of this patent is extended or adjusted under 35 U.S.C. 154(b) by 104 days.

(21) Appl. No.: 15/797,430

(22) Filed: Oct. 30, 2017

(65) Prior Publication Data

US 2018/0198628 A1    Jul. 12, 2018

Related U.S. Application Data

(60) Provisional application No. 62/445,634, filed on Jan. 12, 2017.

(51) Int. Cl.
| | |
|---|---|
| *H04L 9/32* | (2006.01) |
| *G06F 21/57* | (2013.01) |
| *H04L 9/06* | (2006.01) |
| *H04L 9/30* | (2006.01) |
| *G06F 21/44* | (2013.01) |

(52) U.S. Cl.
CPC ............ *H04L 9/3263* (2013.01); *G06F 21/44* (2013.01); *G06F 21/575* (2013.01); *H04L 9/06* (2013.01); *H04L 9/30* (2013.01); *H04L 9/3247* (2013.01); *H04L 9/3268* (2013.01); *H04L 9/3271* (2013.01); *H04L 2209/38* (2013.01)

(58) Field of Classification Search
CPC combination set(s) only.
See application file for complete search history.

(56) References Cited

U.S. PATENT DOCUMENTS

| | | |
|---|---|---|
| 5,519,603 A | 5/1996 | Allbery, Jr. et al. |
| 6,243,695 B1 | 6/2001 | Assaleh et al. |
| 6,560,656 B1 | 5/2003 | O'Sullivan et al. |

(Continued)

FOREIGN PATENT DOCUMENTS

| | | |
|---|---|---|
| EP | 2741228 A2 | 6/2014 |
| WO | 2016109626 A1 | 7/2016 |

OTHER PUBLICATIONS

International Search Report for PCT Application No. PCT/US2015/015337 dated Apr. 28, 2015, 3 pages.

(Continued)

*Primary Examiner* — Aurel Prifti

(57) ABSTRACT

A method includes verifying that firmware of a device is trusted and contains a root of trust. The method also includes verifying that a protected storage of the device contains a private or secret key associated with a device certificate that is stored in a persistent storage of the device. The method further includes verifying the device certificate of the device using the root of trust. In addition, the method includes, in response to verifying that the protected storage contains the private or secret key associated with the device certificate and verifying the device certificate, determining that the device is a genuine device. The root of trust could include a trusted certificate or a trusted public key.

20 Claims, 3 Drawing Sheets

(56) References Cited

U.S. PATENT DOCUMENTS

| | | | |
|---|---|---|---|
| 6,983,994 B2 | 1/2006 | Pino | |
| 6,990,379 B2 | 1/2006 | Gonzales et al. | |
| 7,069,580 B1 | 6/2006 | Deitz et al. | |
| 7,284,278 B2 | 10/2007 | Anson et al. | |
| 7,657,946 B2 | 2/2010 | Yan | |
| 8,381,306 B2 | 2/2013 | McPherson et al. | |
| 8,429,435 B1 | 4/2013 | Clayton et al. | |
| 8,873,746 B2 | 10/2014 | Long et al. | |
| 9,038,162 B2 | 5/2015 | Hagiu et al. | |
| 9,438,628 B2* | 9/2016 | Haridas | H04L 63/20 |
| 9,503,478 B2* | 11/2016 | Chernoguzov | H04L 63/06 |
| 10,038,552 B2* | 7/2018 | Haridas | G06F 21/74 |
| 2003/0061481 A1 | 3/2003 | Levine et al. | |
| 2003/0088650 A1 | 5/2003 | Fassold et al. | |
| 2004/0015262 A1 | 1/2004 | Brown et al. | |
| 2004/0103165 A1 | 5/2004 | Nixon et al. | |
| 2004/0153171 A1 | 8/2004 | Brandt et al. | |
| 2004/0177264 A1 | 9/2004 | Anson et al. | |
| 2005/0060584 A1 | 3/2005 | Ginter et al. | |
| 2005/0102514 A1 | 5/2005 | Bergenwall et al. | |
| 2005/0251680 A1 | 11/2005 | Brown et al. | |
| 2005/0256735 A1 | 11/2005 | Bayne | |
| 2006/0282876 A1 | 12/2006 | Shelest et al. | |
| 2006/0291438 A1 | 12/2006 | Karschnia et al. | |
| 2007/0067634 A1 | 3/2007 | Siegler | |
| 2007/0199046 A1 | 8/2007 | O'Brien | |
| 2007/0283443 A1 | 12/2007 | McPherson et al. | |
| 2008/0010458 A1 | 1/2008 | Holtzman et al. | |
| 2008/0086632 A1 | 4/2008 | Kagle | |
| 2009/0177289 A1 | 7/2009 | Glanzer et al. | |
| 2009/0276537 A1 | 11/2009 | Deverick et al. | |
| 2010/0050267 A1 | 2/2010 | Nochta | |
| 2010/0070743 A1 | 3/2010 | Grigor et al. | |
| 2010/0161817 A1 | 6/2010 | Xiao et al. | |
| 2011/0099361 A1* | 4/2011 | Shah | H04W 12/10 713/2 |
| 2011/0132427 A1 | 6/2011 | Kalkanoglu et al. | |
| 2011/0231450 A1 | 9/2011 | Sinha et al. | |
| 2012/0117380 A1 | 5/2012 | Herberth et al. | |
| 2012/0174182 A1 | 7/2012 | Neely | |
| 2012/0260345 A1* | 10/2012 | Quinn | G06F 21/57 726/26 |
| 2012/0266214 A1 | 10/2012 | Hagiu et al. | |
| 2012/0266252 A1 | 10/2012 | Spiers et al. | |
| 2013/0031360 A1 | 1/2013 | Dewitz et al. | |
| 2013/0111211 A1 | 5/2013 | Winslow et al. | |
| 2013/0198799 A1 | 8/2013 | Staggs et al. | |
| 2014/0007253 A1* | 1/2014 | Hardt | H04L 63/105 726/26 |
| 2014/0331064 A1 | 11/2014 | Ballesteros | |
| 2015/0215338 A1 | 7/2015 | Haridas et al. | |
| 2015/0215339 A1 | 7/2015 | Chernoguzov et al. | |
| 2015/0244742 A1 | 8/2015 | Reynolds et al. | |
| 2016/0087801 A1 | 3/2016 | Jones et al. | |
| 2017/0155511 A1 | 6/2017 | Haridas et al. | |
| 2017/0359171 A1 | 12/2017 | Haridas et al. | |

OTHER PUBLICATIONS

Written Opinion for PCT Application No. PCT/US2015/015337 dated Apr. 28, 2015, 4 pages.

"How IPSec Works," Security Policy, Security Services, Mar. 2003, 31 pages.

"IPSec," Wikipedia, Aug. 2014, 10 pages.

Extended European Search Report for European Application No. 14192912.5 dated Jun. 15, 2015, 7 pages.

Croft et al., "Bootstrap Protocol (BOOTP)," RFC 951, Sep. 1985, 12 pages.

Alexander et al., "DHCP Options and BOOTP Vendor Extensions," RFC 2132, Mar. 1997, 34 pages.

"Bootstrap Protocol," Wikipedia, Mar. 16, 2014, 3 pages.

International Search Report for PCT Application No. PCT/US2015/011937 dated Apr. 28, 2015, 3 pages.

Written Opinion for PCT Application No. PCT/US2015/011937 dated Apr. 28, 2015, 6 pages.

Sanders, "Secure Boot in the Zynq-7000 All Programmable SoC," White Paper: Zynq-7000 AP SoC, XILINX, WP426 (v1.0), Apr. 2013, 10 pages.

Sanders, "Secure Boot of Zynq-7000 All Programmable SoC," Application Note: Zynq-7000 AP SoC, XILINX, XAPP1175 (v2.0), Apr. 2015, 85 pages.

International Search Report and Written Opinion for PCT Application No. PCT/US2017/036407 dated Oct. 13, 2017, 12 pages.

U.S. Office Action for U.S. Appl. No. 14/954,550 dated May 4, 2017, 23 pages.

International Search Report and Written Opinion of the International Searching Authority for PCT Patent Application No. PCT/US2018/013166 dated Apr. 24, 2018, 14 pages.

* cited by examiner

TECHNIQUES FOR GENUINE DEVICE ASSURANCE BY ESTABLISHING IDENTITY AND TRUST USING CERTIFICATES

CROSS-REFERENCE TO RELATED APPLICATION AND PRIORITY CLAIM

This application claims priority under 35 U.S.C. § 119(e) to U.S. Provisional Patent Application No. 62/445,634 filed on Jan. 12, 2017. This provisional application is hereby incorporated by reference in its entirety.

TECHNICAL FIELD

This disclosure generally relates to computing and device security. More specifically, this disclosure relates to techniques for genuine device assurance by establishing identity and trust using certificates.

BACKGROUND

Industrial control systems (ICSs) are routinely used to monitor and control complex industrial processes. An increasing level of security defense mechanisms have been needed as these systems evolved from closed proprietary systems in the early 1990s to convenient, connected, and open systems over the years. Open systems were adopted in a trend shift for increased convenience, improved connectivity, and improved productivity. However, these systems became more vulnerable to exploits due to the widespread knowledge about open system vulnerabilities.

To mitigate these concerns, security architectures began mandating the use of perimeter security and security-hardened nodes. Unfortunately, the subsequent introduction of virtual platforms and remote access support further required additional security countermeasures to prevent unauthorized access and system privilege gains by intruders. Security architectures and solutions thus continued to evolve based on system capabilities and with a common theme of preventing external exploitations of system vulnerabilities.

In 2010, the StuxNet worm specifically targeted certain programmable logic controllers (PLCs) and changed the security landscape within industrial control systems through an insider attack on an Iranian nuclear plant. Subsequent to StuxNet, embedded devices moved to the forefront of security discussions. Vendors started including more security controls in their devices, such as least privilege designs, segregation of duties, and defense in depth, in order to mitigate insider attacks.

With the advent of the "Internet of Things" (IoT) and the "Industrial Internet of Things" (IIoT), new security challenges have surfaced. This is due to a change in embedded device deployment scenarios for ICS vendors. IoT and IIoT devices need Internet connectivity and the ability to publish information to "the cloud" in order to create value for customers.

SUMMARY

This disclosure provides techniques for genuine device assurance by establishing identity and trust using certificates.

In a first embodiment, a method includes verifying that firmware of a device is trusted and contains a root of trust. The method also includes verifying that a protected storage of the device contains a private or secret key associated with a device certificate that is stored in a persistent storage of the device. The method further includes verifying the device certificate of the device using the root of trust. In addition, the method includes, in response to verifying that the protected storage contains the private or secret key associated with the device certificate and verifying the device certificate, determining that the device is a genuine device.

In a second embodiment, a device includes a persistent storage configured to store a device certificate and a protected storage configured to store a private or secret key associated with the device certificate. The device also includes at least one processing device configured to verify that firmware of the device is trusted and contains a root of trust, verify that the protected storage contains the private or secret key associated with the device certificate, and verify the device certificate using the root of trust. The at least one processing device is also configured, in response to verifying that the protected storage contains the private or secret key associated with the device certificate and verifying the device certificate, to determine that the device is a genuine device.

In a third embodiment, a non-transitory computer readable medium contains instructions that when executed cause at least one processing device of an apparatus to verify that firmware of the apparatus is trusted and contains a root of trust. The medium also contains instructions that when executed cause the at least one processing device of the apparatus to verify that a protected storage of the apparatus contains a private or secret key associated with a device certificate that is stored in a persistent storage of the apparatus. The medium further contains instructions that when executed cause the at least one processing device of the apparatus to verify the device certificate of the apparatus using the root of trust. In addition, the medium contains instructions that when executed cause the at least one processing device of the apparatus, in response to verifying that the protected storage contains the private or secret key associated with the device certificate and verifying the device certificate, to determine that the apparatus is a genuine device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As described above, new security challenges have surfaced involving "Internet of Things" (IoT) and "Industrial Internet of Things" (IIOT) devices. IoT has been deemed the "third wave" of the Internet, with a significant global economic impact expected. However, this wave has been slow to materialize and hard to implement. Reasons for this slow adoption include a lack of trust, a lack of proper identity, and a lack of knowledge of the time of events and the chain of custody for devices. Trust in this context indicates that certain devices ascertain they are communicating with correct other devices. Identity in this context indicates that incoming data is associated with the correct device and that outgoing data is addressed to the correct device. This patent document describes techniques in which the factors of trust and identity can be achieved via certificate-based genuine device assurance tests, such as by using x.509 (v3) certificates.

Figure 1:
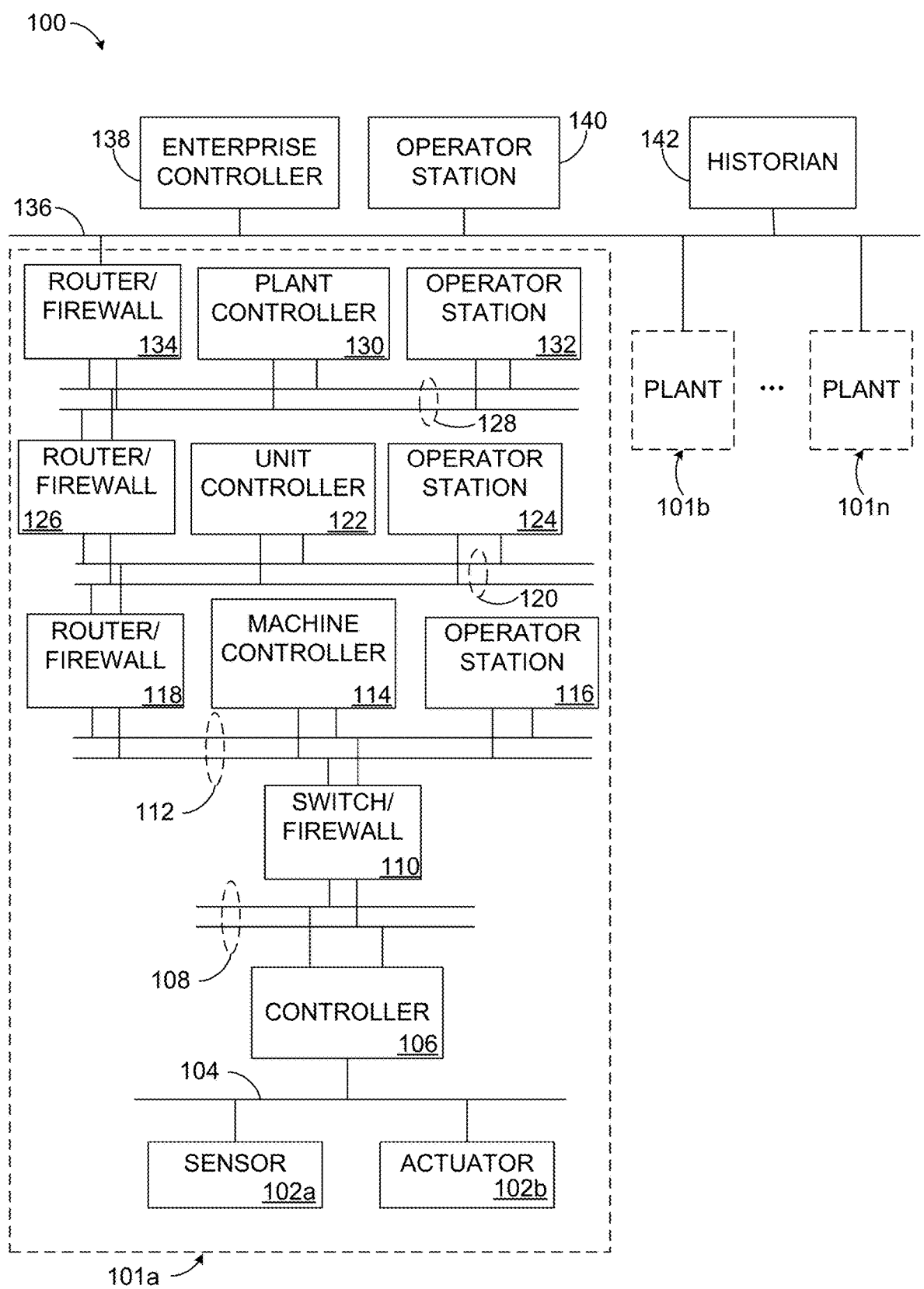
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

One or more networks 104 are coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" includes one or more controllers 106, which are coupled to the network 104. Among other things, each controller 106 may use the measurements from one or more sensors 102a to control the operation of one or more actuators 102b. Each controller 106 includes any suitable structure for controlling one or more aspects of a process system. As a particular example, each controller 106 could represent a computing device running a real-time operating system.

Redundant networks 108 are coupled to the controllers 106. The networks 108 facilitate interaction with the controllers 106, such as by transporting data to and from the controllers 106. The networks 108 could represent any suitable redundant networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system or other operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system or other operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system or other operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system or other operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system or other operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system or other operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system or other operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system or other operating system.

A historian 142 is also coupled to the network 136 in this example. The historian 142 could represent a component that stores various information about the system 100. The historian 142 could, for example, store information used during production scheduling and optimization. The historian 142 represents any suitable structure for storing and facilitating retrieval of information. Although shown as a single centralized component coupled to the network 136, the historian 142 could be located elsewhere in the system 100, or multiple historians could be distributed in different locations in the system 100.

One or more of the devices shown in FIG. 1 could support one or more genuine device assurance tests to help establish trust and identity. For example, an assurance test could verify that the correct firmware runs only on the correct devices. Using this technique, a manufacturer or vendor could prevent counterfeit devices from running genuine firmware. Additional details regarding these techniques are provided below.

Although FIG. 1 illustrates one example of an industrial process control and automation system 100, various changes may be made to FIG. 1. For example, a control and automation system could include any number of sensors, actuators, controllers, servers, operator stations, networks, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which techniques for genuine device assurance can be used. This functionality can be used in any other suitable device or system, and that device or system need not be used for industrial process control and automation.

Figure 2:
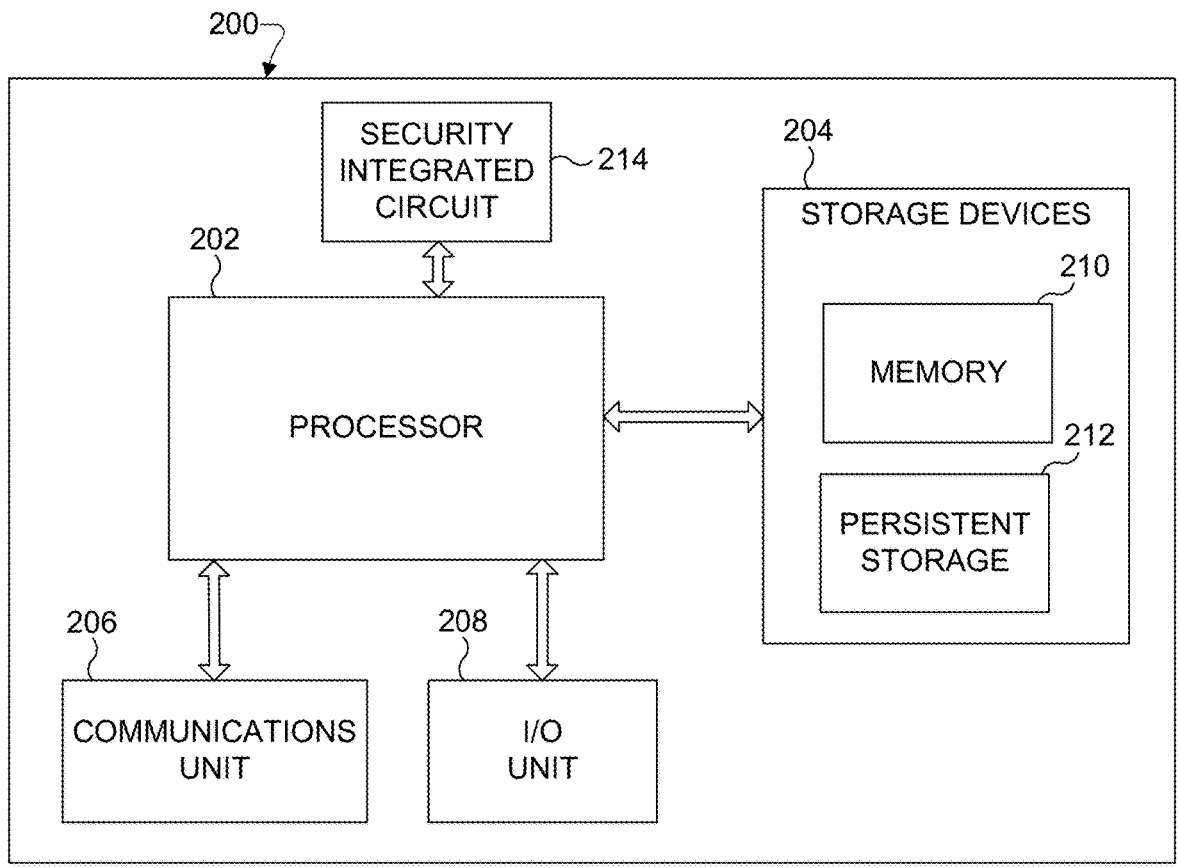
FIG. 2 illustrates an example device supporting a technique for genuine device assurance by establishing identity and trust using certificates according to this disclosure.

FIG. 2 illustrates an example device 200 supporting a technique for genuine device assurance by establishing identity and trust using certificates according to this disclosure. The device 200 could, for example, represent any of the devices shown in FIG. 1 and described above. However, the device 200 could represent any other suitable device or system that implements one or more techniques for genuine device assurance, whether or not used for industrial process control and automation.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. Each processor 202 denotes any suitable processing device, such as one or more microprocessors, microcontrollers, central processing units (CPUs), digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory (like an EEPROM), hard drive, Flash memory, or optical disc.

The communications unit 206 supports communications with other systems or devices. For example, the communications unit 206 could include at least one network interface card or wireless transceiver facilitating communications over at least one wired or wireless network. The communications unit 206 may support communications through any suitable physical or wireless communication link(s). Note, however, that the communications unit 206 is not necessarily required for genuine device assurance to work as intended.

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the I/O unit 208 is not necessarily required for genuine device assurance to work as intended.

The processor 202 could also be coupled to a security integrated circuit (SIC) 214. The SIC 214 performs various security-related operations for the device 200. For example, the SIC 214 could securely store one or more cryptographic keys, such as one or more cryptographic asymmetric private/secret keys. The SIC 214 could also perform signing operations or other operations with the one or more keys. The SIC 214 includes any suitable integrated circuitry that performs one or more operations in a secure manner. For instance, the SIC 214 could represent a cryptographic chip containing processing circuitry and at least one internal memory. The processing circuitry can be configured to perform various cryptographic operations, and at least some of the computations can involve one or more cryptographic keys stored in the internal memory. The cryptographic chip can also be tamper-resistant or tamper-proof to limit or prevent illicit access to the data stored in the internal memory. If the device 200 does not include an SIC 214, the device 200 includes some other form of protected storage for its cryptographic material, such as private/secret key(s).

Although FIG. 2 illustrates one example of a device 200 supporting a technique for genuine device assurance by establishing identity and trust using certificates, various changes may be made to FIG. 2. For example, various components in FIG. 2 could be combined, further subdivided, or omitted and additional components could be added according to particular needs. Also, computing devices and other devices that perform genuine device assurance tests can come in a wide variety of configurations, and FIG. 2 does not limit this disclosure to any particular configuration of device.

Figure 3:
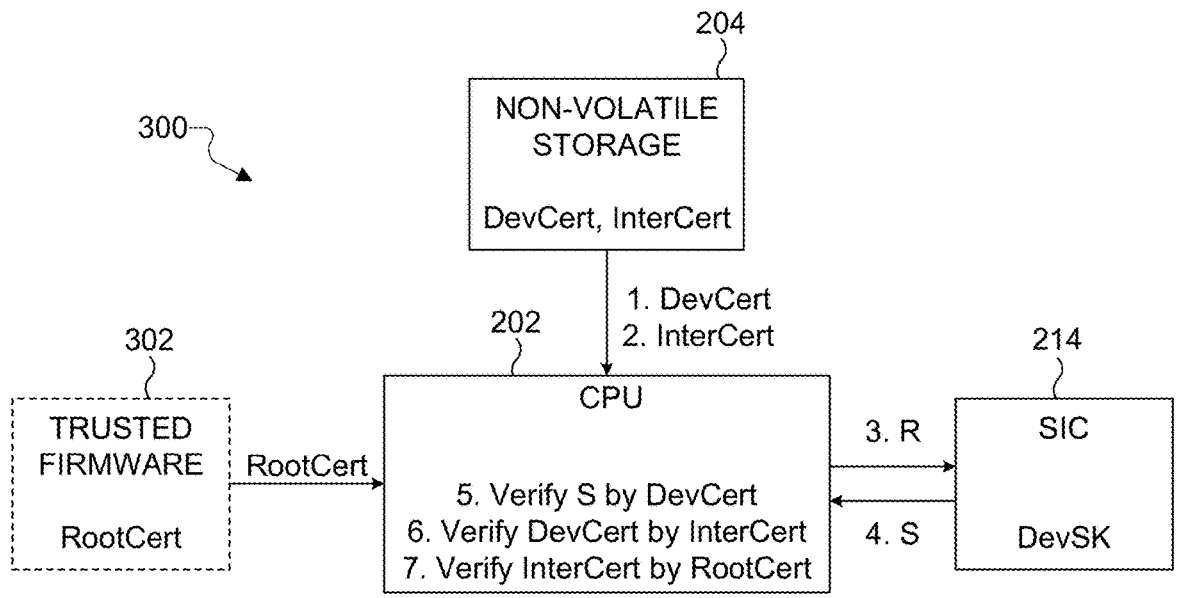
FIG. 3 illustrates an example technique for genuine device assurance by establishing an identity and a trust according to this disclosure.

FIG. 3 illustrates an example technique 300 for genuine device assurance by establishing an identity and a trust according to this disclosure. In the technique 300, a root of trust (RoT), such as a trusted certificate or a trusted public key, is used for genuine device assurance testing. For ease of explanation, the technique 300 shown in FIG. 3 is described with respect to the device 200 of FIG. 2. However, the technique 300 could be used with any other suitable device or system.

The genuine device assurance techniques described in this patent document may not only verify that a device is genuine but also ensure device certificate integrity for that device. The genuine device assurance techniques therefore help to ensure that both (i) a device is genuine and (ii) the device is using genuine firmware 302. In some embodiments, this can be done using a device having a CPU (such as the processor 202) and an external non-volatile storage (such as an EEPROM or other storage device 204). The device also has a dedicated SIC (such as the SIC 214), although the use of the SIC is not required as noted above. The device trusts its own firmware 302, and the firmware 302 contains a root of trust. The device uses the root of trust to verify a device certificate stored in its persistent storage 212, and the device verifies that the SIC 214 contains a private/secret key related to the device certificate. If the device contains a valid device certificate and the device's SIC 214 contains a valid private/secret key for that device certificate, the device determines that it is genuine since it was manufactured in a legitimate factory that was able to obtain the device certificate and store it into the persistent storage 212.

The device performs a secure boot in that it loads only a genuine firmware 302 signed by a trusted key. Hence, it trusts its own firmware 302 and, as the firmware 302 contains a root of trust, the device trusts the root of trust contained in the firmware 302. The device's private/secret key can be generated or stored by the SIC 214, and the SIC 214 can be tamper-resistant or tamper-proof to protect the private/secret key. Thus, the device can use the root of trust in its firmware 302 and the private/secret key stored in its SIC 214 to verify its genuineness.

In some embodiments, a certificate hierarchy can be set up as follows. A Root certificate authority (CA) has a certificate RootCert, and an intermediate CA has a certificate InterCert signed by the Root CA. The device's certificate DevCert is a leaf certificate signed by the intermediate CA, and this is a certificate for an SIC-stored private/secret key DevSK. The DevCert and InterCert certificates can be stored in the non-volatile storage device 204, such as due to size limitations on information that can be stored in the SIC 214. The Root CA's and the intermediate CA's private/secret keys are highly protected, and their usage may require proper authentication and authorization. A signed firmware 302 is common for devices, meaning it is not personalized for each individual device. Since the device certificate DevCert is unique for each device, it may not be part of the signed firmware 302 and can be stored elsewhere. There may be no confidentiality or integrity of the data stored in the non-volatile storage device 204.

As described below, x.509 certificates (or other certificates) are used to establish a chain of trust. A certificate establishes a connection between an entity and its public key. The holder of the respective private/secret key can be described by the "subject" field of the certificate, while the issuer of the certificate can be described by the "issuer" field of the certificate. Both fields can describe the entities by their distinguished names. A certificate may also contain an issuer's digital signature of the certificate. By this digital signature, the issuer manifests that the public key in the certificate belongs to the subject of the certificate. Commonly, x.509 certificates are used in security protocols and standards (such as TLS, IPSec, and SMIME) and can be used for entity authentication, digital signing, or key agreement to name a few uses.

To prepare a device for genuineness testing, the following steps can be performed. A device generates or otherwise obtains a private/secret key DevSK, which is stored in its SIC 214. The device's private/secret key DevSK has a corresponding public key DevPK. Also, the device obtains a device certificate DevCert for its public key DevPK, and the device certificate DevCert is signed by an intermediate CA. A certificate InterCert for the intermediate CA can also be obtained. This can occur by using a trusted agent. In addition, the DevCert and InterCert certificates are stored in the device's EEPROM or other storage device 204. These steps can be done, for example, during device manufacturing where the trusted agent is a manufacturing station with a mutually-authenticated connection to a Public Key Infrastructure (PKI) service that issues device certificates. Another option is a batch certificate provisioning, where devices generate certificate-signing requests that are collected and signed by an intermediate CA and the resulting certificates are stored on the devices.

The following is an example technique that relies on the use of a RootCert certificate as a root of trust, which can be a part of the signed firmware 302, to verify that a device has a valid device certificate DevCert and a related private/secret key. This helps to ensure that only devices that pass certificate provisioning will pass an assurance test. Since the trust anchor of the verification is the RootCert certificate from the signed firmware 302, once the device runs, it trusts its own firmware 302 and hence it trusts the RootCert certificate. Note that instead of a RootCert certificate, a trusted public key or other trusted certificate can be used as a root of trust.

To verify its genuineness, the device can perform the following steps, which are depicted in FIG. 3. During a first operation, the processor 202 reads the device certificate DevCert from the non-volatile storage device 204. During a second operation, the processor 202 reads the intermediate CA's certificate InterCert from the non-volatile storage device 204. These two operations could occur sequentially or in parallel.

A series of operations is performed to verify that the retrieved device certificate DevCert has an associated private/secret key stored in the SIC 214. In the example shown in FIG. 3, this involves the processor 202 generating a random challenge value (denoted R) and sending the random challenge value to the SIC 214 during a third operation. The SIC 214 signs the random challenge value using the private/secret key DevSK to produce a signature (denoted S), which is returned to the processor 202 during a fourth operation. During a fifth operation, the processor 202 verifies the signature using the public key DevPK from the device certificate DevCert. Assuming the signature is verified, this provides an indication to the processor 202 that the private/secret key DevSK associated with the device certificate DevCert is stored in the non-volatile storage device 204.

The processor 202 also verifies the device certificate DevCert based on the root of trust contained in the signed firmware 302. In FIG. 3, this is done by having the processor 202 verify the device certificate DevCert using the intermediate CA's certificate InterCert during a sixth operation and by having the processor 202 verify the intermediate CA's certificate InterCert using the root certificate RootCert from the signed firmware 302 during a seventh operation. The root certificate RootCert therefore forms the basis for verifying the device certificate DevCert. The root certificate RootCert can be used to validate any subordinate (intermediate) certificates that are used to validate the device certificate DevCert, or only the root certificate RootCert or only an intermediate CA's certificate InterCert could be used to validate the device certificate DevCert.

By storing the private/secret key DevSK in the SIC 214, the private/secret key cannot be copied to a non-genuine device, which prevents the production of device counterfeits. Furthermore, allowing the SIC 214 to sign a random challenge value represents proof that it possesses the corresponding private/secret key DevSK. Variations of this approach could also be used, such as when only the RootCert public key is a part of the signed firmware and is used to verify any subordinate certificates.

To show how this approach helps to avoid counterfeit device production using this technique, consider the following example. Assume that a malicious company ABC wants to manufacture fake devices and wants to sell them with legitimate firmware as legitimate devices. Assume that company ABC can buy a genuine device and read-out the firmware from the genuine device's non-volatile memory. Also assume that company ABC can configure its devices to run signed firmware. A firmware verification process could prevent an unauthorized firmware from running on legitimate devices but not from running an authorized firmware on counterfeit devices. However, company ABC is not able to obtain legitimate device certificates as it does not have access to the Root CA's or intermediate CA's private/secret keys. Hence, company ABC is not able to produce a device with a private/secret key and a related certificate rooted at RootCert. Company ABC is also not able to copy a private/secret key related to a device certificate DevCert from a genuine device to its devices since the private/secret key is stored in the genuine device's SIC 214. Company ABC is also unable to fake the SIC operations because it cannot sign arbitrary data (the random challenge), which the authorized firmware can successfully verify using the public key in the device certificate DevCert. As a result, company ABC's devices will not pass the above-described genuineness test.

This approach therefore addresses two factors for an IoT or IIoT design. The two factors are trust and identity. The proposed techniques help to prevent the manufacture of device counterfeits due to lack of proper authorization capabilities to a PKI and due to the lack of an ability to copy private/secret keys from genuine devices. Moreover, the proposed techniques support genuine device assurance through the use of signed firmware and a secure boot process. When these solutions are combined with solutions that help establish time and chain of custody for embedded devices, the adoption of IoT solutions can increase significantly to help realize the promised value creation by IoT for the industrial space.

Although FIG. 3 illustrates one example of a technique 300 for genuine device assurance by establishing an identity and a trust, various changes may be made to FIG. 3. For example, the genuine device assurance techniques here are not limited to the above-described device architecture. The following are non-limiting examples of other architectures that could be used. The described techniques are not limited to industrial control systems and can also be used in other systems, such as IoT devices. Moreover, the described techniques are not limited to a two-level certificate hierarchy. For instance, one can use an intermediate CA certificate InterCert instead of a root CA certificate RootCert, and one can use several or no intermediate CAs instead of one intermediate CA. The described techniques can be modified to use only public keys and their signatures to establish a chain of trust instead of x.509 (v3) certificates. The described techniques can be easily extended to keys that cannot perform signing, such as key-agreement (EC) Diffie-Hellman (DH) keys or a CPU's internal secure key storage/cryptographic coprocessors. The described techniques can be applied in scenarios where a private/secret key is imported to the SIC 214. The described techniques work for devices with and without secure storage (besides a dedicated SIC or a secure storage for cryptographic keys) and for devices with or without SICs capable of storing certificates. The described techniques work if there is or is not confidentiality or integrity of stored data available in a non-volatile memory.

Figure 4:
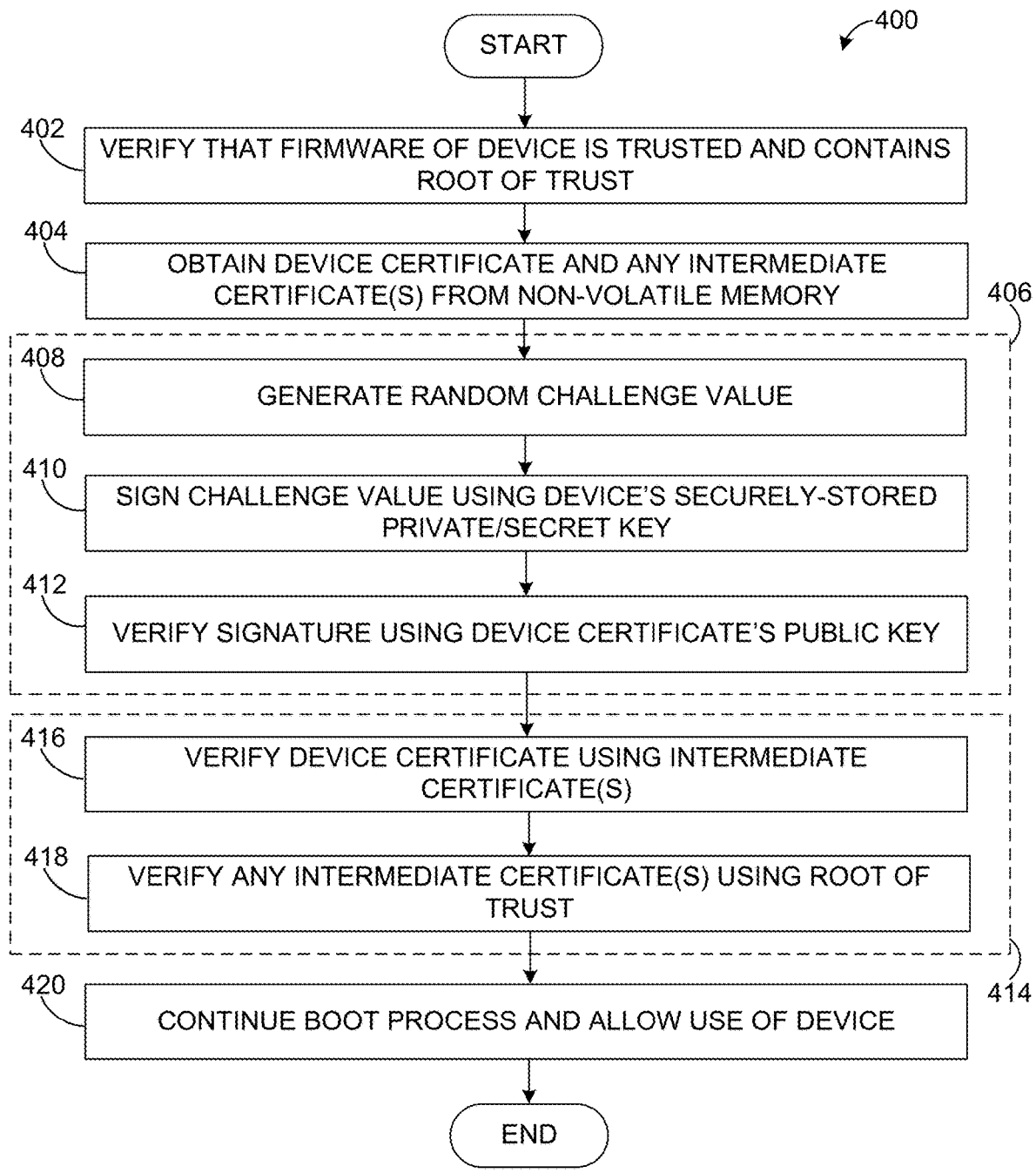
FIG. 4 illustrates an example method for genuine device assurance by establishing identity and trust using certificates according to this disclosure.

FIG. 4 illustrates an example method 400 for genuine device assurance by establishing identity and trust using certificates according to this disclosure. For ease of explanation, the method 400 shown in FIG. 4 is described as involving the device 200 of FIG. 2 and the operations shown in FIG. 3. However, the method 400 could be used with any other suitable device or system.

As shown in FIG. 4, a verification is made that firmware of a device is trusted and contains a root of trust at step 402. This could include, for example, the processor 202 performing a secure boot process. As part of the secure boot process, the processor 202 can retrieve firmware 302 from a non-volatile storage device 204 or other memory and confirm whether the firmware 302 has been digitally signed by an appropriate entity. The firmware 302 includes a root of trust, such as a root CA's certificate RootCert, an intermediate CA's certificate InterCert, or some other trusted certificate or trusted key. If this verification cannot be made, the boot process could terminate, preventing the device from being used.

A device certificate and any intermediate certificates are obtained at step 404. This could include, for example, the processor 202 obtaining the device certificate DevCert and possibly one or more intermediate CAs' certificates InterCerts from the non-volatile storage device 204 of the device. As noted above, the use of intermediate certificates is not required, so there may be no need to retrieve any intermediate certificates during this step.

A verification is made that a private/secret key associated with the device certificate is stored in the device at step 406. As described above, one example technique for doing this involves generating a random challenge value at step 408, signing the random challenge value using the device's private/secret key at step 410, and verifying the signature using the device's public key at step 412. This could include, for example, the processor 202 generating a random value and providing the random value to the SIC 214. This could also include the SIC 214 digitally signing the random value using the private/secret key DevSK that is securely stored in the SIC 214. This could further include the SIC 214 providing the digital signature to the processor 202. In addition, this could include the processor 202 verifying the digital signature using the public key DevPK contained in or otherwise associated with the device certificate DevCert. Note, however, that other approaches for verifying a private/secret key associated with a device certificate could be used. Again, if this verification cannot be made, the process could terminate, preventing the device from being used.

The device certificate is validated based on the root of trust contained in the trusted firmware at step 414. For instance, the device certificate can be verified using the one or more intermediate certificates at step 416, and the intermediate certificate(s) can be verified using the root of trust at step 418. This could include, for example, the processor 202 using a public key in an intermediate CA's certificate InterCert to verify whether the device certificate DevCert was signed by an intermediate CA. This could also include the processor 202 using the root of trust to verify whether the intermediate CA's certificate InterCert was signed by the Root CA. It is possible to have a chain of signings involving the Root CA and multiple intermediate CAs, or the device certificate DevCert could be signed by a Root CA or intermediate CA directly with no other signings used. However the device certificate is signed, the processor 202 can verify that all signings between the root of trust and the device certificate are valid. Once again, if this verification cannot be made, the process could terminate, preventing the device from being used.

Assuming all of the validations and verifications are made, the boot process can continue, allowing the device to be used at step 420. This could include, for example, completing the boot process, loading any applications or other functionality, and allowing the device to enter normal operation. The validations and verifications performed earlier in this process help to ensure both (i) the firmware 302 is genuine and (ii) the firmware 302 is executing on a genuine device and not a counterfeit.

Although FIG. 4 illustrates one example of a method 400 for genuine device assurance by establishing identity and trust using certificates, various changes may be made to FIG. 4. For example, while shown as a series of steps, various steps in FIG. 4 could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   verifying that firmware of a device deployed in an industrial process control and automation system is trusted and contains a root of trust by:
   verifying that a protected storage of the device contains a private or secret key associated with a device certificate that is stored in a persistent storage of the device;
   obtaining the device certificate from the protected storage;
   generating a random challenge value;
   providing a signature for the challenge value using the device's private or secret key; and
   verifying the device certificate of the device using the root of trust by verifying the signature using the device's private or secret key;
   determining that the device is a genuine device in response to verifying the root of trust and that the protected storage contains the private or secret key associated with the device certificate and verifying the device certificate; and
   allowing use of the device.

2. The method of claim 1, wherein verifying that the protected storage contains the private or secret key associated with the device certificate further comprises:
   verifying the device certificate using an intermediate certificate using the root of trust;
   and
   continue allowing use of the device.

3. The method of claim 1, wherein the protected storage comprises a security integrated circuit.

4. The method of claim 1, wherein verifying that the firmware of the device is trusted comprises performing a secure boot process.

5. The method of claim 1, wherein verifying the device certificate of the device using the root of trust comprises:
   validating the device certificate using an intermediate certificate authority's certificate; and
   validating the intermediate certificate authority's certificate using the root of trust.

6. The method of claim 1, wherein the root of trust comprises at least one of:
   a trusted certificate and a trusted public key.

7. The method of claim 1, further comprising:
   in response to determining that the device is a genuine device, allowing the device to be placed into normal operation.

8. A device deployed in an industrial process control and automation system, comprising:
   a persistent storage configured to store a device certificate;
   a protected storage configured to store a private or secret key associated with the device certificate; and
   at least one processing device configured to:
   verify that firmware of the device contained in the protected storage is trusted and contains a root of trust by;
   verifying that the protected storage contains the private or secret key associated with the device certificate that is stored in a persistent storage of the device;
   obtaining the device certificate from the protected storage;
   generating a random challenge value;
   providing a signature for the challenge value using the device's private or secret key; and
   verifying the device certificate using the root of trust by verifying the signature using the device's private or secret key;
   determining that the device is a genuine device in response to verifying that the protected storage contains the private or secret key associated with the device certificate and verifying the device certificate; and
allowing use of the device.

9. The device of claim 8, wherein, to verify that the protected storage contains the private or secret key associated with the device certificate, the at least one processing device is configured to:
   verifying the device certificate using an intermediate certificate using the root of trust; and
   continue allowing use of the device.

10. The device of claim 8, wherein:
   the persistent storage comprises a non-volatile memory; and
   the protected storage comprises a security integrated circuit.

11. The device of claim 8, wherein, to verify that the firmware of the device is trusted, the at least one processing device is configured to perform a secure boot process.

12. The device of claim 8, wherein, to verify the device certificate of the device using the root of trust, the at least one processing device is configured to:
   validate the device certificate using an intermediate certificate authority's certificate; and
   validate the intermediate certificate authority's certificate using the root of trust.

13. The device of claim 8, wherein the root of trust comprises at least one of:
   a trusted certificate and a trusted public key.

14. The device of claim 8, wherein the protected storage comprises a tamper-resistant or tamper-proof cryptographic integrated circuit chip.

15. A non-transitory computer readable medium containing instructions that when executed cause at least one processing device of an apparatus deployed in an industrial process control and automation system to:
   verify that firmware of the apparatus is trusted and contains a root of trust by;
      verifying that the protected storage contains the private or secret key associated with the device certificate that is stored in a persistent storage of the apparatus;
      obtaining the device certificate from the protected storage;
      generating a random challenge value;
      providing a signature for the challenge value using the device's private or secret key; and
      verifying the device certificate using the root of trust by verifying the signature using the device's private or secret key;
   determining that the device is a genuine device in response to verifying that the protected storage contains the private or secret key associated with the device certificate and verifying the device certificate; and
   allowing use of the device.

16. The non-transitory computer readable medium of claim 15, wherein the instructions that when executed cause the at least one processing device to verify that the protected storage contains the private or secret key associated with the device certificate comprise:
   instructions that when executed cause the at least one processing device to:
      verify the device certificate using an intermediate certificate using the root of trust; and
      continue allowing use of the device.

17. The non-transitory computer readable medium of claim 15, wherein the instructions that when executed cause the at least one processing device to verify that the firmware of the apparatus is trusted comprise:
   instructions that when executed cause the at least one processing device to perform a secure boot process.

18. The non-transitory computer readable medium of claim 15, wherein the instructions that when executed cause the at least one processing device to verify the device certificate of the apparatus using the root of trust comprise:
   instructions that when executed cause the at least one processing device to:
      validate the device certificate using an intermediate certificate authority's certificate; and
      validate the intermediate certificate authority's certificate using the root of trust.

19. The non-transitory computer readable medium of claim 15, wherein the root of trust comprises at least one of: a trusted certificate and a trusted public key.

20. The non-transitory computer readable medium of claim 15, further comprising instructions that when executed cause the at least one processing device to:
   in response to determining that the apparatus is a genuine device, allow the apparatus to be placed into normal operation.

* * * * *